United States Patent [19]

Burges et al.

[11] Patent Number: 5,487,117
[45] Date of Patent: Jan. 23, 1996

[54] GRAPHICAL SYSTEM FOR AUTOMATED SEGMENTATION AND RECOGNITION FOR IMAGE RECOGNITION SYSTEMS

[75] Inventors: Christopher J. Burges, Freehold; Yann A. Le Cun, Lincroft, both of N.J.; Ofer Matan, Escondido Village, Calif.

[73] Assignee: AT&T Corp, Murray Hill, N.J.

[21] Appl. No.: 327,339

[22] Filed: Oct. 11, 1994

Related U.S. Application Data

[63] Continuation of Ser. No. 227,082, Apr. 8, 1994, abandoned, which is a continuation of Ser. No. 816,415, Dec. 31, 1991, abandoned.

[51] Int. Cl.$^6$ .................................................. G06K 9/00
[52] U.S. Cl. ........................................ 382/173; 382/228
[58] Field of Search ................................ 382/14, 15, 21, 382/33, 36, 37, 38, 39, 40, 45, 54, 56; 395/21

[56] References Cited

U.S. PATENT DOCUMENTS

4,905,259  2/1990  Nardi ................................. 382/56
4,933,872  6/1990  Vandenberg et al. ............... 382/15
5,157,738 10/1992  Carpenter et al. .................. 382/15

*Primary Examiner*—Jose L. Couso
*Attorney, Agent, or Firm*—Charles E. Graves; Martin I. Finston

[57] ABSTRACT

Apparatus and processes are described for the automatic recognition of alphanumeric images. A set of cuts are made to the image which include incorrect segmentations. The resulting "cells" comprising in their totality the created segments of the image are then analyzed to determine which cells are legal neighbors and which are not. All cells which are legal neighbors are then presented as connected nodes. A pruning of nodes which are related to certain predetermined image cuts is effected. Each set of remaining connected nodes is then presented to a recognizer which identifies the image and assigns a specified probability to the output. Many cells which are not legal neighbors are thereby not presented to the recognizer, thus saving substantially on computations per recognized image.

29 Claims, 5 Drawing Sheets

VITERBI ALGORITHM (FROM G. D. FORNEY)

| DEFINITIONS: | M | = | NUMBER OF NODES |
|---|---|---|---|
| | $x(x_k)$ | = | PATH TERMINATING AT $x_k$ |
| | $\lambda(x_k)$ | = | LENGTH OF PATH $x_k$ |
| | $V_{x_k}$, $1 \leq x_k \leq M$ | = | VALUE (LENGTH) ASSOCIATED WITH NODE $x_k$ |
| | $\xi$ | = | AN ARC IN THE TRELLIS |
| STORAGE: | k | = | (TIME INDEX) |
| | $\hat{x}(x_k)$, $1 \leq x_d \leq M$ | = | (SURVIVOR TERMINATING IN $x_k$) |
| | $\Gamma(x_k)$, $1 \leq x_k \leq M$ | = | (SURVIVOR LENGTH) |
| INITIALIZATION: | k = 0; | | |
| | $\hat{x}(x_0) = x_0$; | $\hat{x}(m)$ ARBITRARY, | $m \neq x_0$; |
| | $\Gamma(x_0) = 0$; | $\Gamma(m) = \infty$, | $m \neq x_0$. |
| RECURSION: | SET $\lambda[\xi_k = (x_{k+1}, x_k)] = V_{x_k}$ | | |
| | (MODIFIED: SET $\lambda[\xi_k = (x_{k+1}, x_k)] = V_{x_k}(k)$) | | |
| | $\Gamma(x_{k+1}, x_k) = \Gamma(x_k) + \lambda[\xi_k = (x_{k+1}, x_k)]$ | | |
| | FOR ALL $\xi_k = (x_{k+1}, x_k)$. | | |
| | FIND $\Gamma(x_{k+1}) = \min_{x_k} \Gamma(x_{k+1}, x_k)$ FOR EACH $x_{k+1}$; | | |
| | STORE $\Gamma(x_{k+1})$ AND THE CORRESPONDING SURVIVOR $\hat{x}(x_{k+1})$. | | |
| | SET k = k+1 AND REPEAT UNTIL k = K. | | |

GRAPHICAL SYSTEM FOR AUTOMATED SEGMENTATION AND RECOGNITION FOR IMAGE RECOGNITION SYSTEMS

GOVERNMENT INTEREST

This invention was funded under a governmental contract awarded by the United States Postal Service, No. 104230-90-C-2456. This application is a continuation of application Ser. No. 08/227,082, filed on Apr. 8, 1994, now abandoned and which is a continuation of application Ser. No. 07/816,415, filed Dec. 31, 1994, abandoned.

FIELD OF THE INVENTION

This invention relates to recognition machines and, particularly, to a novel arrangement in such machines for specifying scores from which a probabilistic determination may be made of the identity of an entire (single or multicharacter) unknown alphanumeric image.

BACKGROUND OF THE INVENTION

Pattern recognition machines such as the neural network machine: described in U.S. Pat. No. 5,067,164, issued Nov. 19, 1991, and assigned to Applicants' assignee, are finding increasing use in the rapid and automatic identification of unknown alphanumeric and other symbols or images. In these applications, the images of an unknown pattern such as a string of unknown handwritten characters first are segmented in accordance with some segmentation scheme designed to isolate the strokes which comprise the individual characters of the string. Following segmentation, the segments are analyzed to determine their most likely identity.

In most prior systems, these segments are required to be a defined "correct" set of segments of the image, before the recognition system is queried. Requiring a correct segment set puts severe constraints on the performance of the segmentation system, however, because an incorrect segmentation will almost invariably result in an incorrect solution to the recognition problem. A method of calling the recognizer which relaxes this constraint, but which at the same time is time-efficient in that the number of "calls" to the recognition engine is kept at a minimum, would be advantageous in terms of overall system performance.

A related problem is that current systems which are designed to recognize whole words, but which are based on single character recognition systems, require that the image data be segmented beforehand, usually manually. This is a very time consuming and expensive process.

Additionally, many prior recognition systems are highly problem-dependent, in that they use many ad hoc heuristics specific to the recognition tasks at hand, and require many parameters which must be carefully tuned for the problem at hand. This can result in systems which become very hard to improve, due to the highly complex interaction between all the parameters. Such systems also are very hard if not impossible to adapt to slightly different recognition tasks, because of the specific nature of the heuristics used.

An additional aspect of prior art recognition systems is that the recognition problem is often not considered in isolation, but is instead constrained to lie within bounds imposed by a lexicon. Prior systems often use a lexicon to veto recognition results as a post-processing step. A system which could readily incorporate small lexicons (which themselves may be dynamic, in that they may be generated by some other part of a larger system), and which returns the lexicon with a score attached to each entry, would improve recognition machine performance.

OBJECTS OF THE INVENTION

Accordingly, one object of the invention is to provide a recognition system which is both easier to improve upon and easier to generalize to other recognition problems.

Another object of the invention is to provide a simple and fast method for scoring entries in a lexicon, given an image to be recognized.

A specific object of the invention is to automatically recognize handwritten alphanumeric script more rapidly and at the same time more accurately in real time.

SUMMARY OF THE INVENTION

The invention is a new and useful approach to recognizing images, in which rather than trying to determine the "correct" segmentation before calling the recognizer, a set of cuts are assumed which allow for incorrect segmentations. The invention requires merely that the correct set of cuts be contained within the given set of cuts, and that the recognition system be able to attach a confidence score (as well as a meaning) to the images sent to it.

The segmentation/recognition problem is cast as a graphical shortest path problem, the solution of which is advantageously realized by novel modifications to an existing fast shortest path algorithm.

The inventive process may be appreciated by understanding the illustrative embodiment, described hereinafter, which involves constructing a directed, acyclic graph. Each node of the graph corresponds to one of the presented segments. The segment size may be one or more "cells," defined hereinafter, with the cell count depending on how many cuts are generated by the segmentation process compared to how many characters are expected to be in the image. Each node in the graph is assigned a "length" which is derived from the recognizer score for the segment corresponding to that node. All arcs leaving a given node are then assigned that same length. A complete description of how the nodes, arcs and arc lengths in the graph are derived, is given below.

Advantageously, the system is given, as a list, a subset of the set of given cuts, called "definite" cuts, which are cuts estimated to be correct based on prior processing. This information on definite cuts is used to significantly reduce the amount of processing required by the recognition engine.

The nodes at the beginning point in the graph correspond to the left-hand side of the image; and the nodes at the end-point in the graph corresponding to the right-hand side of the image. The graph is constructed in such a way that every path through the nodes corresponds to a particular legal segmentation of the image; and further, is constructed such that every possible legal segmentation of the image corresponds to a particular path through the graph.

The invention is, in part, a methodology for assigning lengths to the arcs in the graph, such that the shortest path traversing the graph corresponds to the optimal segmentation and recognition of the image. Once determinations have been made as to the sets of nodes which are legal neighbors, the invention then prescribes the assignment of lengths to paths on the graph such that a shortest path through connected nodes of the graph corresponds to the optimum segmentation and solution. Thus, the methodology advantageously provides the overall highest probability solution of the segmentation, even if that solution contains low-scoring nodes.

The invention takes an image and a set of segments of that image, such that the correct set of segments are at least contained within the complete set of segments given, and efficiently finds that correct set of segments; and thereafter returns the recognition result for the image, with an attached score indicating a confidence value.

In accordance with the invention, two nodes are connected if, and only if, they are legal neighbors. In the simplest case, two nodes are legal neighbors if and only if the right-hand edge of the left-hand segment is the same as the left-hand edge of the right-hand segment.

The invention further teaches a way for the user to specify how many nodes the path is to traverse. Thus, if the path is constrained to traverse five nodes, the solution corresponds to a segmentation of the image into five pieces. This feature is an essential part of how lexicon scoring is achieved by the invention.

The invention further contemplates removing, wherever possible, certain segments from the complete set of segments prior to the recognition process, so that the downstream processing can be simplified and shortened. Thus in very simple cases, the problem will reduce to the traditional problem of recognizing an image whose segments correspond to only the correct segments; but in more complex cases, incorrect segmentations can be taken into account and will not necessarily result in incorrect recognition.

In the case of digit recognition, the recognizer returns ten probabilities, one for each digit possibility, such that the highest probability corresponds to the most favored candidate solution. Thus, given some level of single character recognition performance, the inventive system is able to then automatically segment the data, based only on knowing the "truth" (the actual ASCII string corresponding to the image). This automated segmentation is useful for data generation, in particular for generation of data for training. The new system is able to "bootstrap" itself in the learning process without requiring that all of its data be manually segmented beforehand.

The invention is described hereinafter in an example of its use, wherein the recognition engine is a neural network recognizer. However, workers in the art will appreciate that the inventive scheme involves a general organizing and presentation of the segments to the recognizer and subsequent processing of the recognition outputs; and therefore may be practiced in any pattern recognition system subject to the constraints described above. The invention thus is not specific to any particular image recognition system. It merely requires that the recognition engine, when given an image to recognize, is designed to return a set of probabilities for each possible answer.

The invention and its further objects, features, and advantages are more fully presented below.

DETAILED DESCRIPTION OF AN ILLUSTRATIVE EMBODIMENT

The patent applications of C. J. Burges, Ser. Nos. 07/816,415 and 08/227,082, filed on even date herewith, relating to a "hit or deflect" image cutting process is hereby incorporated by reference.

Throughout this description of the invention, the term "cut" is defined as a splitting of the image into two pieces. Thus for example, an image of five handwritten digits will require at least four cuts (not including the cuts defined by the edges of the image). In this example, if more than four cuts are given, then one (or more) of them must be incorrect cuts. A correct cut will in general delimit two alphanumeric characters.

Additionally, the term "definite cut" is a cut which is flagged by the segmentation process as being one of the final, correct cuts. For example, if the image contains several contiguous columns of background, the center of that part of the image might be flagged as a "definite cut".

The word "cell" is a part of the image between two adjacent cuts. By definition, a cell contains no cuts, save those which define its borders. A "segment" is a piece of the image which consists of one or more adjacent cells. The word "neighbor" refers to a relationship between two segments. The term "legal neighbors" refers to two segments which satisfy a prescribed constraint, such as, for example, that the left-hand edge of right-hand segment is the same as the right-hand edge of the left-hand segment. This particular constraint can be generalized to handle "overlap" and "skip".

"Overlapped neighbors" refers to two segments wherein the left edge of the right-hand segment physically falls inside of the left-hand segment. A "skip" refers to two segments which are taken to be legal neighbors even though they do not touch. The term "legal segmentation" refers to a choice of the cuts such that the resulting segmentation of the image is comprised of only legal neighbors. The term "directed acyclic graph" is a collection of nodes connected by one-way or "directed" arcs and which contains no loops. A "node" of the graph corresponds to a segment of the image on a 1:1 basis. An "arc" is a connection between two nodes which traverses no intermediate nodes. The word "path" means a set of contiguous arcs through the graph. A "child" of a node is a node arrived at by traveling along one and only one arc in the permitted direction from a previous or "parent" node. The word "straddling" a definite cut refers to a segment which crosses a definite cut.

Finally, an "optimal" segmentation is that segmentation which receives the highest scoring solution, and is the process output in the unconstrained case.

Figure 1:
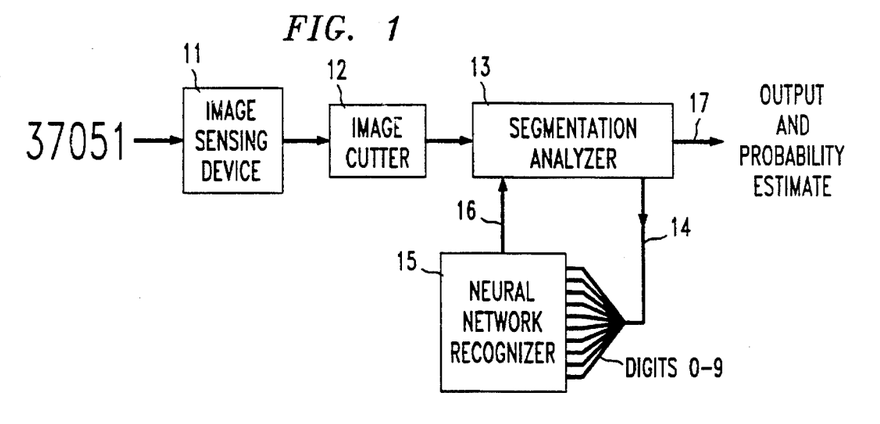
FIG. 1 shows a high level block diagram view of the invention.
Figure 2:
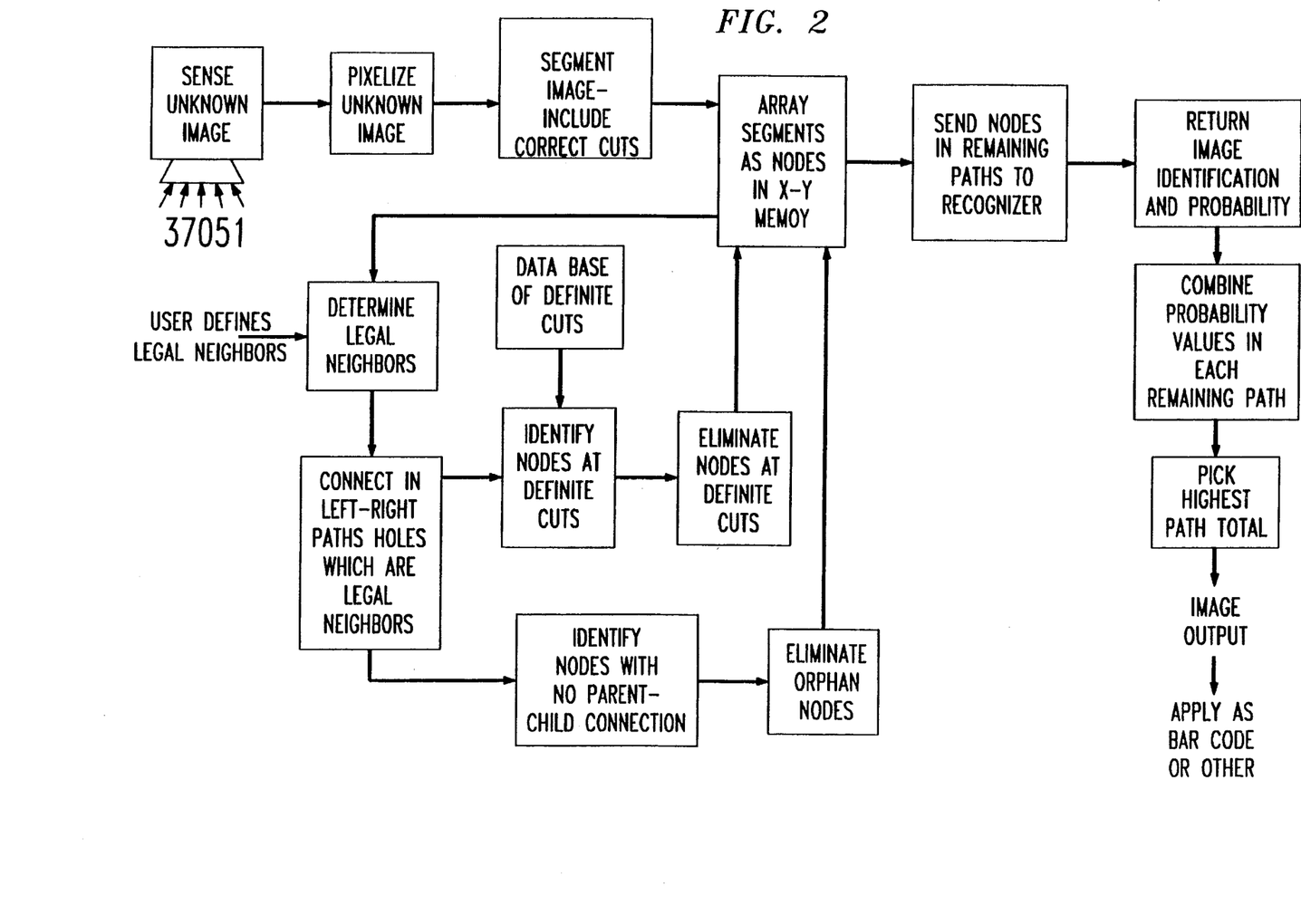
FIG. 2 shows a flow chart of the process.

FIG. 1 shows a system for practicing the invention. An image-sensing device 11 scans an unknown alphanumeric symbol such as a 5-digit zip-code. The image data is converted to conventional pixel format and presented to an image cutter 12. Cutter 12 segments the 5-digit code into several cells sufficiently large in number to contain the "correct" cutting of the unknown image, using four particular cuts into the five separate digits, as illustrated in FIG. 3.

In accordance with the invention, the cuts now are analyzed in segmentation analyzer 13. As will be described in detail below, analyzer 13 operates on successive inputs of the segment data to eliminate certain segments. All segments remaining are presented to the recognizer 15 through a feedback loop 14, 16, the several segments being represented by the multiple arrows. The output of recognizer 15 is presented to analyzer 13 where further processing occurs and an output is generated as to the digit and its probability estimate.

In the description below, for simplicity, it is assumed throughout that the number of characters in the word to be recognized is known. In the case that this number is not known, the procedure may be applied for several different candidate numbers of characters, and the overall highest scoring combination is taken as the solution. In the latter case, the scores must be "normalized" by taking the Nth root, (where N is the supposed number of characters present, of the overall score), so that the comparison is done using the per-character scores.

Figure 3:
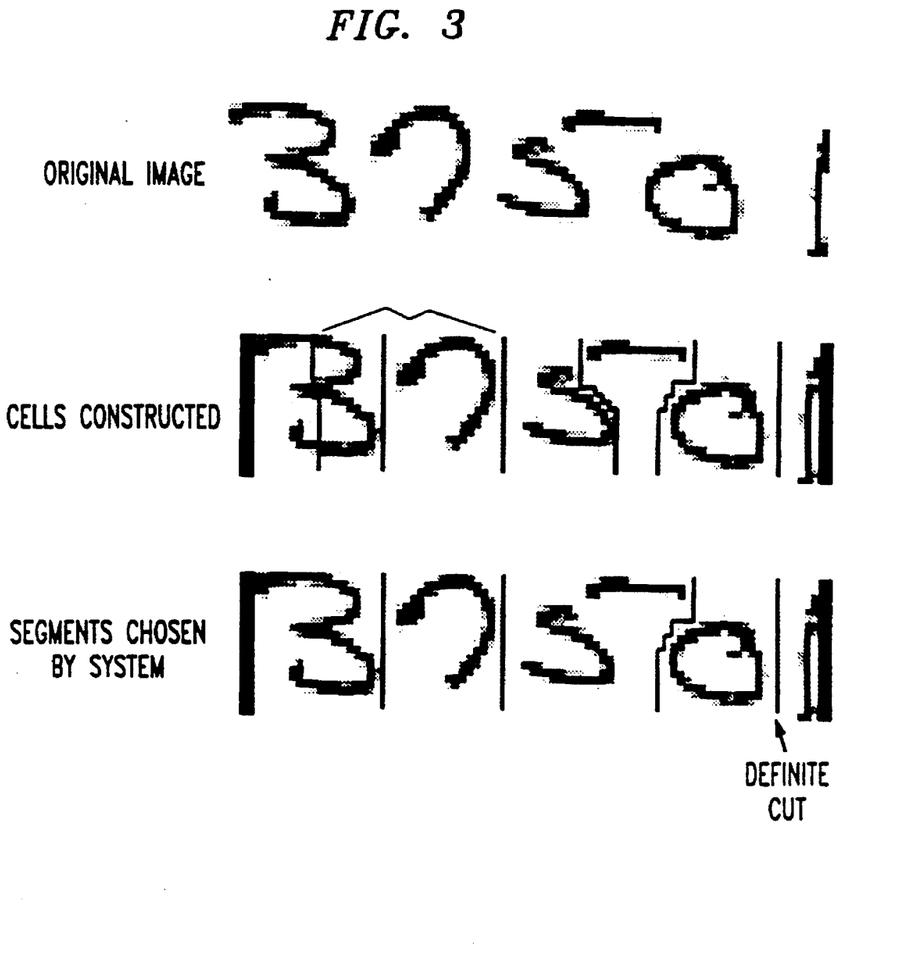
FIG. 3 is a diagram of sequented characters.

In FIG. 3, there is illustrated a set of numerical characters which have been segmented in accordance with one particular segmentation method. An original image of the string "37051" is segmented into constructed cells. The final segmentation choice as presented to the recognition system is shown in the middle of the figure, labelled "Cells Constructed." The segmentation chosen by the graphical segmentation/recognition system is shown at the bottom of the figure, labelled "Segments Chosen by System." The manner of effecting the segmentation cuts is not critical, it being understood that essentially any method of segmentation lends itself to the practice of the invention.

Figure 4:
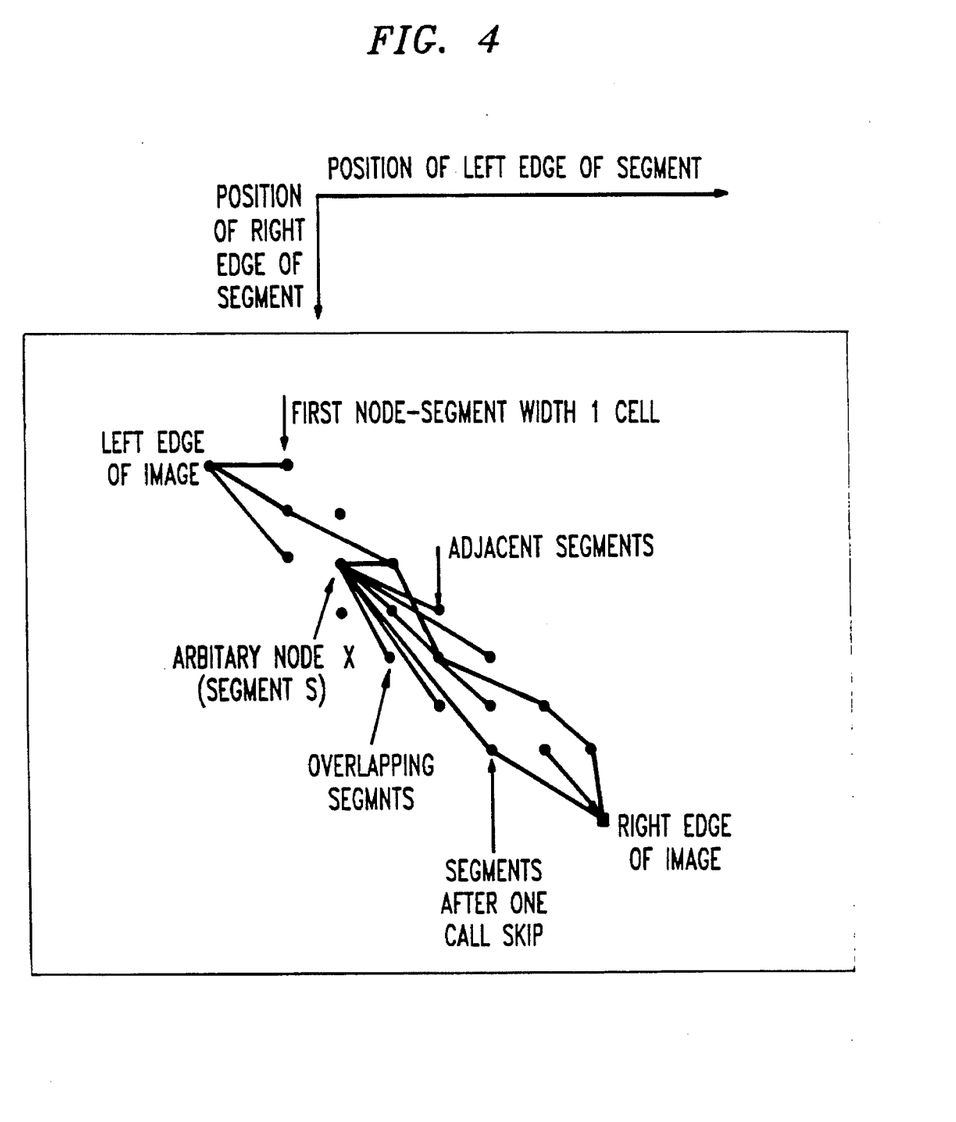
FIG. 4 is a directed acyclic graph.

In accordance with another aspect of the invention, the final segmentation choice may be made using the analytic processes of a directed acyclic graph, shown in FIG. 4. The graph is constructed by first identifying the nodes, and then attaching arcs between nodes which are legal neighbors.

Each node corresponds to an image segment which has been previously created by the cutting steps, and which consists of one or more "cells." The nodes of FIG. 4 correspond to the segmentation of the string of FIG. 3. Two nodes in the graph are connected if the segments to which they correspond are "legal neighbors"; two nodes are not connected if the corresponding segments are not "legal neighbors." Thus, before the graph of FIG. 4 is constructed, what constitutes a "legal neighbor" must be defined. In most cases, the simplest definition is sufficient, namely, two neighbors are taken to be legal if the right hand edge of the left hand segment is equal to the left hand edge of the right hand segment. However in more complex cases, "overlap" and/or "skip" may be allowed. For example, two legal neighbors may be allowed to overlap by one cell, or two legal neighbors may be allowed to have one cell between them which is not included in either of them. These possibilities are illustrated in FIG. 4: the column of nodes labelled "Overlapping segments" overlap by one cell with the node labelled "X"; and the column of nodes labelled "Segments after one cell skip" correspond to segments whose left-hand edge is separated by one cell from the right hand edge of node "X." This feature of the invention advantageously addresses the fact that in many images, to be read by the recognition engine, characters may be overlapping ("overlap"), and in some images, there may be noise (such as crossed out characters) between characters (a "skip").

The construction of the graph of FIG. 4 requires obtaining the total number of segments from the segmentation step. In the example shown in FIGS. 3 and 4, the total number of cells is 7, and the total number of segments is 18. (The latter is computed by noting that, in the case shown in FIG. 3, a segment can consist of from one up to three cells.) Thus the graph is completely specified (prior to "pruning" using definite cuts, which is described below) by specifying the minimum number of cells to a segment (usually one), the maximum number of cells to a segment (see below), the number of overlap cells allowed between two neighboring segments (user-defined), and the number of skip cells allowed between two neighboring segments (also user-defined).

The maximum number of cells that may be combined on the graph into a segment is determined according to the invention as follows. Let N be the expected number of characters in the image being segmented. In the instant example, that number is five. Let C be the number of cuts resulting from the segmentation process. The value of C is not known beforehand and will vary depending on the image being processed. The value of C is completely determined by the particular segmentation process chosen. For example, for the image shown in FIG. 3, the number of cuts (excluding the edges of the image) is 6 and thus the value of C is 6. The required number of correct cuts is N−1, or 4 in this case. Thus, the maximum number of cells that should be combined into a segment is:

(1) MAX–SEGMENT–WIDTH=$C-N+2$

The maximum number of cells by which two segments are allowed to overlap is also determined by the application. In the present application relating to the recognition of United States Postal Service zip-codes, the number of cells of overlap is taken to be zero, because zip-code digits which significantly overlap are relatively infrequent in practice. Further, the maximum number of cells allowed to be skipped between neighboring segments is also determined by the application. In the present example, the number of permitted skips is taken to be zero. In general, if $W_{Max}$ is the maximum allowed segment width in cells, $W_{Min}$ is the minimum allowed segment width in cells (usually equal to one), and if, as above, C is the number of cuts resulting from the segmentation process, then the number of segments Numseg (which is equal to the number of nodes in the graph) is given by Numseg=$(W_{Max}-W_{Min}+1)(C+2-(W_{Max}+W_{Min})/2)$.

A path through nodes of the graph in FIG. 4 corresponds to a particular segmentation of the image shown in FIG. 3. The left edge of the image is represented by the filled box denoted "Left Edge of Image"; and the right edge of the image is represented by the box denoted "Right Edge of Image". The left edge of the image is connected to three nodes, corresponding to the three possible segments of FIG. 3 whose left edge is the left edge of the image. The right edge of the image is similarly connected. For clarity, not all legal arcs in the graph of FIG. 4 have been shown.

In the region of the graph of FIG. 4 denoted by the label "Arbitrary Node "X" (Segment "S")", there are shown the connections for one particular node, corresponding to the segment labeled "S" in FIG. 3. This segment is two cells in width because it contains part of the "three" and the "seven" in the image. For the case of allowed overlap=1 cell and allowed skip=1 cell, this node has nine children. These are: (A) The column of three nodes denoted "Overlapping segments" in FIG. 4, whose segments overlap by one cell; (B) The column of three nodes denoted "Adjacent segments" in FIG. 4, corresponding to segments whose left edge coincides with the right edge of this segment; and (C) The column of three nodes denoted "Segments after one cell skip" in FIG. 4, whose segments' left edges are one cell to the right from node X's right edge.

It should be noted that the overlap and skip shown in FIG. 4 is shown for illustrative purposes only, and that the particular ZIP code application being described does not allow for overlap or skip.

In accordance with another aspect of the invention, the definite cuts of the unknown image are used to effect a pruning or elimination of certain of the nodes in the graph. Since every node in the graph corresponds to a call to the recognizer, and since calls to the recognizer are likely to be time consuming, pruning results in a faster overall process. In addition, pruning reduces the possible number of segmentations, and thus reduces the likelihood of an incorrect final segmentation.

Thus, if a node in the graph corresponds to a segment which straddles a definite cut, then that node is removed from the graph, as are all all arcs leaving that node or terminating on it.

For example, the described segmentation scheme identified the last cut (between the "0" and the "1" in the image) as being a definite cut (see FIG. 3). The node denoted by "Y" in FIG. 4 corresponds to the segment consisting of the last two cells in the image, which straddles the definite cut; and accordingly, all arcs leaving or terminating on that node are removed from the graph. In general this is done for all nodes which correspond to segments which straddle definite cuts. All such nodes then become "sterile" (i.e., such nodes have no children).

In a general graph, as a consequence of the removal of these nodes and arcs, some other nodes may also become sterile, even though they themselves do not correspond to segments which straddle a definite cut. Since all paths terminating on these nodes would necessarily end there, these nodes are themselves removed from the graph, as are all arcs terminating on them. This process of identifying sterile nodes is thus continued recursively until all sterile nodes have been removed from the graph. Since every node corresponds to a call to the recognizer, this "graph pruning" results in a considerable speed-up of the overall recognition process.

Now, in accordance with the invention, lengths are assigned to nodes. These lengths may be thought of as being attached to all arcs leaving a given node and connecting to other nodes. The length is generated from a segment by sending that segment to the recognizer.

The recognizer has ten outputs in this illustrative embodiment, one for each digit, where the value of each output denotes the probability attached to the corresponding digit. The details of the recognition engine are not new, and may, for example be those of the afore-noted U.S. Pat. No. 5,067,164. Thus the highest output corresponds to the most probable answer for that digit; and if the image is not in fact a digit, then the highest output will be small compared to unity.

The probabilities are then converted to lengths by taking their negative Log. Adding these lengths then corresponds to multiplying the associated probabilities, so that the length of a path in the graph of FIG. 4 will correspond to the probability associated with that particular sequence of segments.

After populating the graph with lengths, the shortest path through the graph which passes through K nodes, where K is chosen by the user, is calculated from the box denoting the left edge of the image to the box denoting the right edge of the image in FIG. 4. The shortest path for the problem shown in FIG. 3 is shown as the light grey line in FIG. 4, and corresponds to the final segmentation shown at the bottom of FIG. 3. K is the expected number of characters in the image.

In accordance with another aspect of the invention, an available fast shortest path algorithm known in the art as the Viterbi algorithm, is now used to calculate the shortest length. The Viterbi algorithm is fully described in the article G. David Forney, Jr., *The Viterbi Algorithm*, Proceedings of the IEEE, Vol. 61, No. 3, March 1973, which article is hereby incorporated in its entirety by reference.

Figure 5:
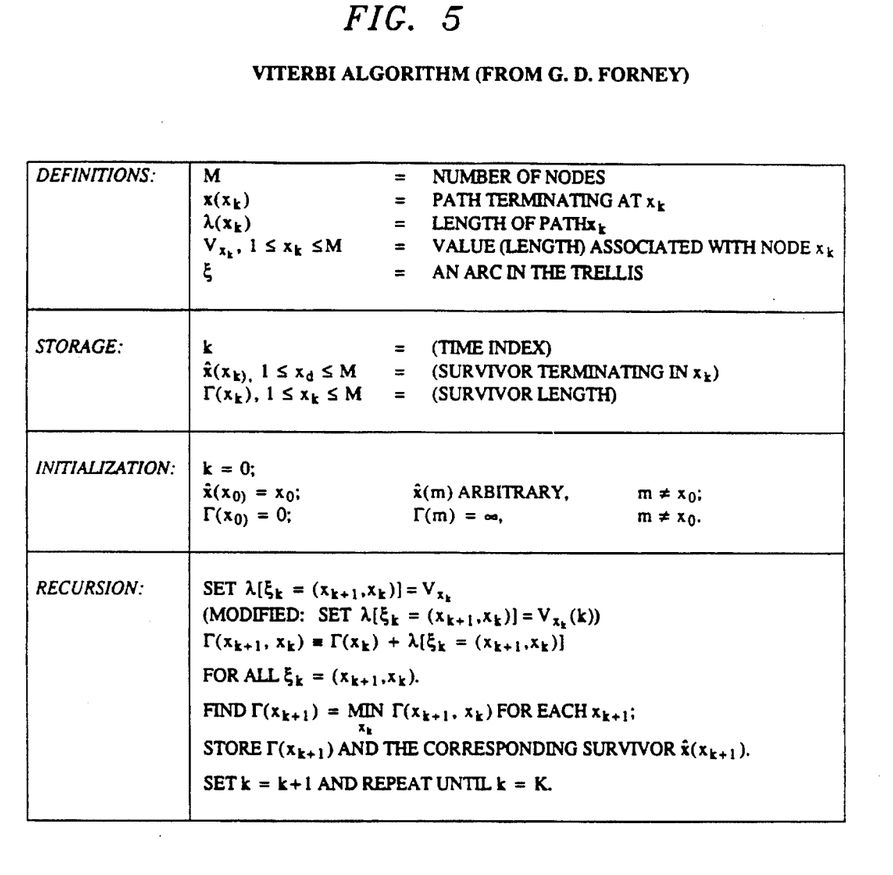
FIG. 5 is a presentation of part of an algorithm useful in practicing the invention.
Figure 6:
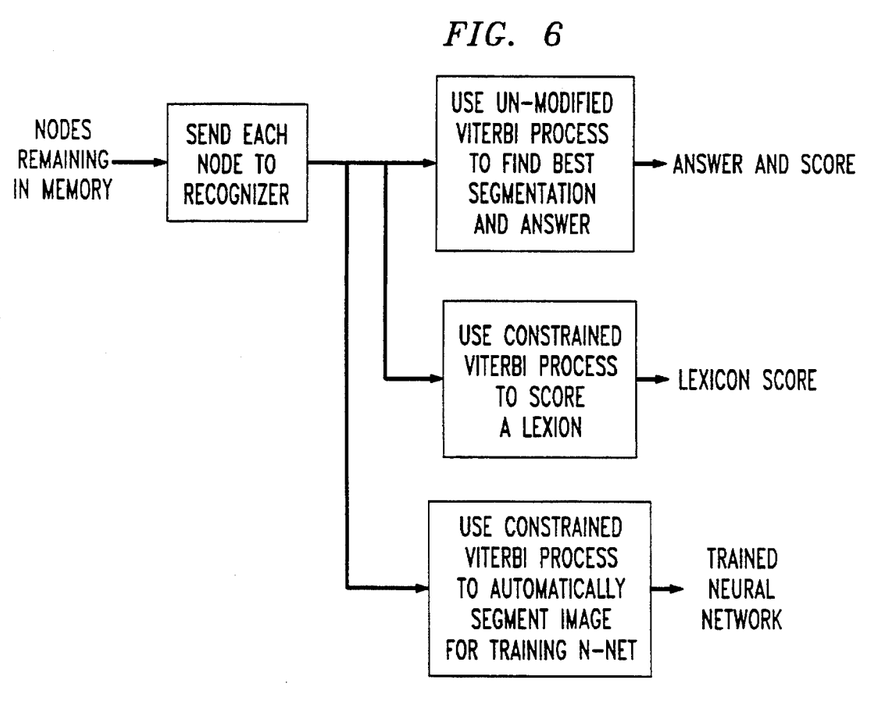
FIG. 6 is a process diagram of the invention.

An implementation of the Viterbi algorithm, useful in the instant invention and presented fully in the cited article, is summarized in FIG. 5. FIG. 5 is identical to the formal statement of the algorithm given on page 272 of the article, with the following exceptions: For clarity, a Definitions heading is added; The quantity $V_{x_k}$ is introduced, which is equal to the value (length) associated with node $x_k$; Two lines have been added immediately under the Recursion: section, namely "Set $\lambda[\xi_k=(x_{k+1}, x_k)]=V_{x_k}$" and "(Modified: Set $\lambda[\xi_k=(x_{k+1}, x_k)]= V_{x_k}(k))$". For the application of the instant illustrative embodiment, the score associated with a given arc is put equal to the value $V_{x_k}$, where $x_k$ denotes that arc's parent node. Thus all arcs leaving a given node are assigned the same length. Further, regarding the last item in the above list, the first statement, beginning "Set . . . ", is simply the instruction to set the length of all arcs leaving node $x_k$ equal to the length value associated with node $x_k$. The second statement, beginning "Modified . . . ", will be explained further below.

The Viterbi algorithm allows one to obtain, not just the shortest path, but the shortest path which traverses a (user specified) number of nodes. The Viterbi algorithm is thus applied to the graph to find the shortest path which traverses K nodes, which in turn corresponds to a segmentation of the image into K characters. The corresponding segmentation of the image can immediately be found by simply examining each node along the path and determining which segment it corresponds to; the corresponding optimal solution simply corresponds to the highest scoring digit associated with the recognizer outputs for each such node. The optimal solution, the manually found "truth", the product of the five per-digit scores, and the number of definite cuts (given in parentheses) are shown at the bottom of FIG. 3 for the image shown at the top of FIG. 3.

In addition to the above, a modification of the Viterbi algorithm is used which allows the highest scoring solution to be found which not only traverses K nodes but which also matches a user-determined "answer". This enables the system to be used to score a lexicon, which is a frequent need in certain pattern recognition problems, where, for example, the word to be recognized is known to belong to a limited lexicon. This modification is contained in the statement beginning "Modified . . . " in FIG. 5. The modification requires that not only the highest score from the recognizer be kept for each node, but that all scores be kept.

To describe the modification, the specific example of digit recognition is used. In that case, the recognizer produces ten outputs, each corresponding to a probability associated with that digit. The use of the (unmodified) Viterbi algorithm requires that only the top scoring candidate be kept, and that the corresponding length be associated with the node. For the modified algorithm, all ten output probabilities must be kept for each node. Then the value attached to the arcs leaving a given node depend on the time step k (thus in FIG. 5, $V_{x_k}$ becomes an explicit function of k). For example, if the modified algorithm were used, and the string of digits to be scored was "07733", then the arcs leaving all nodes in the first time step would have their attached length corresponding to the recognizer score for "0", and the arcs leaving all nodes in the second time step would have their attached length corresponding to the recognizer score for "7", and so on. The net result is that the modified algorithm will provide the highest scoring path which gives the answer "07733", and will give the associated score. This can be done for all members of a lexicon, resulting in a confidence score being generated for all members of the lexicon.

This modification also allows the use of a single character recognizer to segment the image automatically. If the number of segments (i.e. expected number of characters) is specified, and the "truth" associated with each such segment is also specified, then the modified algorithm will find the shortest path which not only traverses K nodes, but which also generates a solution corresponding to the (user specified) truth. The modified algorithm thus finds the best possible segmentation of the image into characters, given the initial set of cuts (which may contain incorrect cuts), and given the constraint that the truth is known. This feature is extremely useful in automatically generating segmented images, given the original images and their associated "truths" (ASCII strings). Below, by way of illustration, one particular use of this feature for Neural Network training is described, for the problem of training a neural network for the recognition driven segmentation of ZIP Codes.

In this case, the process starts with a Neural Net that has been previously trained on isolated digits, and with a large data set of images of ZIP codes. The images have associated "truth" (i.e. each image has a corresponding ASCII ZIP Code, found manually previously), but have not been previously segmented. First, a set of candidate cuts is generated by a segmentation system, where the set has a very high probability of containing the correct set of cuts, but where the set may also have incorrect cuts. The graphical representation described above is then constructed. The modified Viterbi algorithm is then used, together with the "truth" associated with the image, to find the correct segmentation of the image. The network is then trained on the image segments corresponding to each digit.

Counterexamples can also be automatically generated, by using the Viterbi algorithm without specifying that the path found correspond to the known truth. The result thus found therefore corresponds to use of the network under "test" conditions, and if the segmentation found differs from the segmentation found using the modified algorithm (which uses the "truth"), that segmentation can be used as a counter example for further training. This method has the significant advantage that the network is trained on counter examples that are generated dynamically as the training proceeds. The network thus trained has, in a sense, also been trained to segment, in that it has learned to reject images which are incorrectly segmented.

We claim:

1. In symbol recognition apparatus comprising an image sensor, an image segmenter, a memory, a recognizer including a library of known images and a comparison means for generating a measure of probability that a sensed image is a one of said known images, the improvement in recognizing one or more unknown alphanumeric symbols, comprising:

means for sensing an image of said symbol string with said image sensor;

means for segmenting the image of said symbol string with said segmenter to construct candidate cuts through said string, thereby creating a multiplicity of image segments potentially greater in number than the symbols present in said string and sufficient in number to include the correct segmentation;

means for arranging in said memory said segments as a sequence of nodes, the nodes at the beginning point of said sequence corresponding to the left-hand side of said string, and the nodes at the end-point in said sequence corresponding to the right-hand side of said string;

means for identifying all nodes corresponding to segments which are legal neighbors and connecting with arcs from left to right all such nodes, thereby creating multiple paths across said sensed image, each said path corresponding to a particular legal segmentation of said image;

means for comparing said segments to predetermined data in a definite cut database thereby to identify all nodes which straddle a definite cut;

means for eliminating from said memory said last-named nodes as well as all arcs connected to each said node;

means for identifying nodes which because of the preceding step no longer have a parent-child connection, and recursively eliminating all said nodes and associated arcs from said memory;

means for generating in said recognizer a measure of probability for each remaining node returning said measure to said memory for association with the respective node; and means for combining said probability measures associated with all of the nodes in each said remaining node path, thereby to produce outputs consisting of a symbol identification and a total probability measure associated with each particular node path.

2. Apparatus in accordance with claim 1, further comprising:

means in said generating means for converting said probability measure to a negative log number.

3. Apparatus in accordance with claim 2, wherein said combining means further comprises:

means for adding said negative log numbers to find the shortest path which traverses remaining nodes;

means for examining each node along the path and determining which segment it corresponds to; and means for determining the highest score associated with the recognizer outputs for each such node.

4. Apparatus in accordance with claim 1, 2, or 3, wherein legal neighbors are those nodes which correspond to adjoining segments where the right-hand edge of the left-hand segment is the same as the left-hand edge of the right-hand segment.

5. Apparatus in accordance with claim 1, 2, or 3, wherein legal neighbors are those nodes which correspond to adjoining segments which overlap by one or more cells.

6. Apparatus in accordance with claim 1, 2, or 3, wherein legal neighbors are those nodes which correspond to nearby segments which have one or more cells between them which is not included in either one of said nearby segments.

7. In symbol recognition apparatus comprising an image sensor, an image segmenter, a memory, a neural network recognizer including a library of known images and a comparison means for generating a measure of probability that a sensed image is a one of said known images, the improvement in recognizing one or more unknown alphanumeric symbols, comprising:

means for sensing an image of said one or more symbols with said image sensor and converting said sensed image to pixel format; means for segmenting said pixel image of said symbols with said segmenter to construct candidate cuts through said symbols, thereby creating a multiplicity of image cells greater in number than the symbols present, and sufficient in number to include the correct segmentation;

means for arranging in said memory said segments as a graphical array of several node sequences, the nodes at the beginning point of said sequence corresponding to the left-hand side of said graph, and the nodes at the end-point in said sequence corresponding to the right-hand side of said graph;

means for identifying all nodes corresponding to segments which are legal neighbors and connecting with graphed arcs from left to right all such nodes, thereby creating multiple paths across said sensed image, each said path corresponding to a particular legal segmentation of said image;

means for providing a predetermined database of definite cuts information and comparing said cuts to said database information thereby to identify all nodes which straddle a definite cut;

means for eliminating from said memory said last-named nodes as well as all arcs connected to each said node;

means for generating in said neural network recognizer a said measure of probability for each remaining node returning said measure to said memory for association with the respective node; and means for combining said probability measures associated with all of the nodes in each said remaining node path, thereby to produce outputs consisting of a symbol identification and a total probability measure associated with each particular node path.

8. Apparatus in accordance with claim 7, wherein said generating means further comprises means for converting said probability measures to a negative log number.

9. Apparatus in accordance with claim 8, wherein said combining means further comprises means for adding said negative log numbers to find the shortest path which traverses remaining nodes;

means for examining each node along the path and determining which segment it corresponds to; and means for determining the highest score associated with the recognizer outputs for each such node.

10. Apparatus in accordance with claim 7, 8, or 9 further comprising means for identifying nodes which because of said elimination step no longer have a parent-child connection, and means for recursively eliminating all said nodes and associated arcs from said memory.

11. Apparatus in accordance with claims 7, 8, or 9, wherein legal neighbors are those nodes which correspond to adjoining segments where the right-hand edge of the left-hand segment is the same as the left-hand edge of the right-hand segment.

12. Apparatus in accordance with claims 7, 8, or 9, wherein legal neighbors are those nodes which correspond to adjoining segments which overlap by one or more cells.

13. Apparatus in accordance with claims 7, 8, or 9, wherein legal neighbors are those nodes which correspond to nearby segments which have one or more cells between them which is not included in either one of said nearby segments.

14. In an alphanumeric symbol recognition engine comprising an image sensor, an image segmenter, a memory, a neural network recognizer including a library for receiving known images and a comparison means for generating multiple measures of probability for a known inputted image with respect to all possible alphanumeric members of the class to which said inputted image belongs, apparatus for automatically generating individual character training images using input images and their corresponding "truth" information, comprising:

means for sensing one or more images of said known alphanumeric symbols with said image sensor and converting said sensed images to pixel format;

means for segmenting said pixel images of said alphanumeric symbols with said segmenter to construct candidate cuts through said images, thereby creating a multiplicity of sequential image cells possibly greater in number than the alphanumeric symbols presented, and sufficient in number to include the correct segmentation of each said image;

means for arranging in said memory said cells as a graphical array of several node sequences, the nodes at the beginning point of said sequence corresponding to the left-hand side of said graph, and the nodes at the end-point in said sequence corresponding to the right-hand side of said graph;

means for identifying all nodes corresponding to segments which are legal neighbors and connecting with graphed arcs from left to right all such nodes, thereby creating multiple paths across said sensed images, each said path corresponding to a particular legal segmentation of said images in one-to-one correspondence;

means for providing a predetermined database of definite cuts information and comparing said cuts to said database information thereby to identify all nodes which straddle a definite cut;

means for eliminating from said memory said last-named nodes as well as all arcs connected to each said node;

means for generating in said neural network recognizer a said measure of probability for each remaining node and returning said measure to said memory for association with the respective node; and means for combining and storing all said probability measures associated with all of the nodes in all said remaining node paths, thereby to produce alphanumeric identification data for said library consisting of a symbol identification and a total probability measure associated with all particular node paths;

whereby segmentation of said image is substantially automatic.

15. Apparatus in accordance with claim 14, wherein said generating means further comprises means for converting said probability measure to a negative log number.

16. Apparatus in accordance with claim 15, wherein legal neighbors are those nodes which correspond to adjoining segments where the right-hand edge of the left-hand segment is the same as the left-hand edge of the right-hand segment.

17. Apparatus in accordance with claim 15, wherein legal neighbors are those nodes which correspond to adjoining segments which overlap by one or more cells.

18. Apparatus in accordance with claim 15, wherein legal neighbors are those nodes which correspond to nearby segments which have one or more cells between them which is not included in either one of said nearby segments.

19. A method for machine-reading a string of unknown alphanumeric symbols on a graphical record, comprising a) with an image sensor, scanning the graphical record, thereby to produce a pixel image of the symbol string;

b) segmenting the pixel image into a plurality of cells equal in number to at least the expected number of alphanumeric symbols in the string;

c) storing each resulting cell in a memory device;

d) selecting at least some of the cells;

e) recalling each of the selected cells from the memory device and presenting said cell as input to a recognition engine; and f) receiving from the recognition engine a probability measure which indicates the likelihood that the cell belongs to the same class as some member of a library of known images, wherein:

g) the storing step comprises arranging in said memory said cells, or combinations thereof, as a sequence of nodes, the nodes at the beginning point of said sequence corresponding to the left-hand side of said string, and the nodes at the end-point in said sequence corresponding to the right-hand side of said string;

h) the selecting step comprises identifying all nodes corresponding to segments which are legal neighbors and connecting with arcs from left to right all such nodes, thereby creating multiple paths across said sensed image, each said path corresponding to a particular legal segmentation of said image;

i) the selecting step further comprises comparing said segments to predetermined data in a definite cut database thereby to identify all nodes which straddle a definite cut of said string image;

j) the selecting step further comprises eliminating from said memory said last-named nodes as well as all arcs leading from or terminating on each said node;

k) the receiving step is performed such that a probability measure is thereby associated with each of the nodes that remain after step (j); and l) the method further comprises combining said probability measures associated with all of the nodes in each said remaining node path, thereby to produce outputs consisting of a symbol identification and a total probability measure associated with each particular node path.

20. The method of claim 19, further comprising, after the eliminating step, the step of identifying nodes which because of said elimination step no longer have a parent-child connection, and recursively eliminating all said nodes and associated arcs from said memory.

21. The method of claim 19, further comprising the step of expressing each probability measure as a negative log number, and wherein the combining step comprises:

adding said negative log numbers to find the shortest path which traverses remaining nodes;

examining each node along the path and determining which segment it corresponds to; and determining the highest scoring symbol associated with the recognizer outputs for each such node.

22. The method of claim 19, wherein legal neighbors are those nodes which correspond to adjoining segments where the right-hand edge of the left-hand segment is the same as the left-hand edge of the right-hand segment.

23. The method of claim 19, wherein legal neighbors are those nodes which correspond to adjoining segments which overlap by one or more cells.

24. The method of claim 19, wherein legal neighbors are those nodes which correspond to nearby segments which have one or more cells between them which is not included in either one of said nearby segments.

25. A method for training a neural network recognition engine, including a reference library for recording therein known images, to recognize alphanumeric symbols, the method comprising:

a) with an image sensor, scanning at least one graphical record, thereby to produce a pixel image of a symbol string borne by said record;

b) segmenting the pixel image into a plurality of cells equal in number to at least the expected number of alphanumeric symbols in the string;

c) storing each resulting cell in a memory device;

d) selecting at least some of the cells;

e) recalling each of the selected cells from the memory device and presenting said cell as input to the recognition engine; and f) receiving from the recognition engine a probability measure which indicates the likelihood that the cell belongs to the same class as some member of a library of known images, wherein:

g) the storing step comprises arranging in said memory said cells, or combinations thereof, as a sequence of nodes, the nodes at the beginning point of said sequence corresponding to the left-hand side of said string, and the nodes at the end-point in said sequence corresponding to the right-hand side of said string;

h) the selecting step comprises identifying all nodes corresponding to segments which are legal neighbors and connecting with arcs from left to right all such nodes, thereby creating multiple paths across said sensed image, each said path corresponding to a particular legal segmentation of said image;

i) the selecting step further comprises comparing said segments to predetermined data in a definite cut database thereby to identify all nodes which straddle a definite cut of said string image;

j) the selecting step further comprises eliminating from said memory said last-named nodes as well as all arcs leading from or terminating on each said node;

k) the receiving step is performed such that a probability measure is thereby associated with each of the nodes that remain after the eliminating step;

l) the method further comprises combining said probability measures associated with all of the nodes in each said remaining node path, thereby to produce alphanumeric identification dam comprising a symbol identification and a total probability measure associated with each particular node path; and m) recording said alphanumeric identification data in the library.

26. The method of claim 25, wherein said generating step comprises converting said probability measure to a negative log number.

27. The method of claim 25, wherein legal neighbors are those nodes which correspond to adjoining segments where the right-hand edge of the left-hand segment is the same as the left-hand edge of the right-hand segment.

28. The method of claim 25, wherein legal neighbors are those nodes which correspond to adjoining segments which overlap by one or more cells.

29. The method of claim 25, wherein legal neighbors are those nodes corresponding to nearby segments which have one or more cells between them which are not included in either one of said nearby segments.

\* \* \* \* \*